Nov. 23, 1926.
C. SCHRAMM
1,608,433
CHASER TAP
Filed June 22, 1923
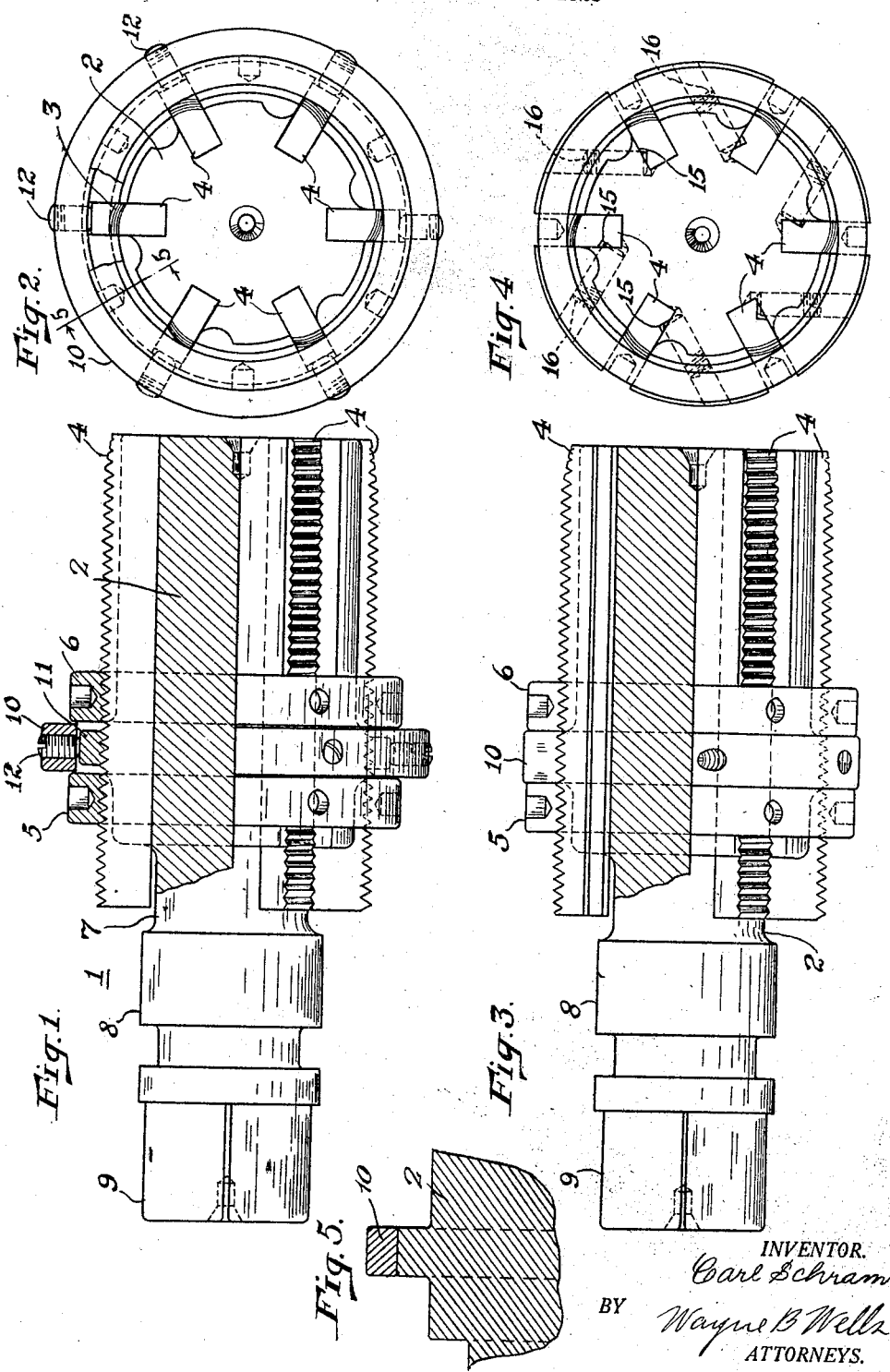
INVENTOR.
Carl Schramm
BY Wayne B Wells
ATTORNEYS.

Patented Nov. 23, 1926.

1,608,433

UNITED STATES PATENT OFFICE.

CARL SCHRAMM, OF WEST HARTFORD, CONNECTICUT, ASSIGNOR TO PRATT & WHITNEY COMPANY, OF NEW YORK, N. Y., A CORPORATION OF NEW JERSEY.

CHASER TAP.

Application filed June 22, 1923. Serial No. 647,148.

My invention relates to taps for cutting threads and particularly to chaser taps having detachable chaser members.

One object of my invention is to provide a chaser tap having detachable chasers that shall have improved means not only for insuring the chasers against any longitudinal movement relative to the body member of the tap but also for holding them securely in set position.

Another object of my invention is to provide a chaser tap of the above indicated character that shall be provided with means for threadably connecting the detachable chasers on each side of a collar portion, which is attached to the body member of the tap, and that shall be provided with the means for wedging the chasers between the collar portion and the body member of the tap to hold the chasers firmly in position.

In the accompanying drawing:

Figure 1 is a side view, partially in section, of a chaser tap constructed in accordance with my invention.

Fig. 2 is an end view of the chaser tap shown in Fig. 1.

Fig. 3 is a side view, partially in section, of a modification of my invention.

Fig. 4 is an end view of the chaser tap shown in Fig. 3.

Fig. 5 is a sectional view taken on line 5—5 of Fig. 2.

Referring to Figs. 1 and 2 of the drawing, a chaser tap 1 is shown comprising a body member 2 having grooves 3 formed therein, chasers 4, which are located in the grooves 3, and two holding rings 5 and 6. The body member 2 of the tap comprises a cylindrical part 7 having the grooves 3 formed therein and a shank 8 which has a squared head 9 formed thereon. A collar 10, which is preferably formed separate from the body member of the tap and shrunk in place thereon, has openings formed therein in alignment with the grooves 3.

The holding rings 5 and 6 are disposed on opposite sides of the collar portion 10 and are threadably connected to the teeth of the chasers. By firmly screwing the two holding rings 5 and 6 against the collar portion 10, it is apparent the rings securely hold the chasers against any longitudinal movement. Moreover, it is apparent the angle of the threads on the holding rings and the angle of the teeth on the chasers serve to wedge the chaser members firmly into engagement with the body member of the tap. The holding rings 5 and 6 are each integral rings and are attached to the chasers from opposite ends of the tap. By reason of the reduced diameter of the shank 8, it is apparent the holding ring 5 can be easily attached to the chasers from the shank end of the tap.

In the opening formed in the collar portion 10 opposite each chaser is disposed a holding block 11. The holding block 11, which is associated with each chaser 4, is preferably provided with teeth corresponding to the teeth in the associated chaser. A set screw 12, which is threadably connected to the collar portion 10, is associated with each block 11 and serves to force the block firmly into engagement with the teeth on the chasers. Accordingly, it is apparent the set screw 12 serves to wedge the associated chaser firmly between the body member of the tap and the collar portion 10. The auxiliary holding means comprising the set screws 12 and the blocks 11 serve to insure the chasers not only against any longitudinal movement but also to insure them being held securely in position in the grooves 3.

My invention is closely related to the chaser tap disclosed in the copending application of P. F. Vokal and Carl Schramm, Serial No. 572,009, filed June 30, 1922, and to the chaser tap disclosed in the copending application of P. F. Vokal and Carl Schramm, Serial No. 647,145 filed on even date herewith.

Referring to Figs. 3 and 4 of the drawing, a modification of my invention is illustrated wherein set screws, which are secured to the collar portion of the chaser tap, directly engage the chasers. Inasmuch as the chaser tap shown in Figs. 3 and 4 is very similar to the chaser tap shown in Figs. 1 and 2, only a portion of the chaser tap in Figs. 3 and 4 will be described in detail. Similar parts shown in Figs. 3 and 4 to those shown in Figs. 1 and 2 will be indicated by like reference characters. The holding rings 5 and 6 in Fig. 3 operate in the same manner as the rings 5 and 6 shown in Fig. 1. Such rings, as heretofore set forth, not only serve to prevent longitudinal movement of the chasers but also serve to hold the chasers in set position in the grooves formed in the body member of the tap. The chasers 4, shown in Fig. 3 of the drawing, project through the collar portion 10 in the same manner as the chasers shown in Fig. 1 but no room is provided above the chasers in the collar portion 10 for the insertion of holding blocks. However, the chasers 4 are provided with notches or shoulders 15 in the side thereof which are engaged by set screws 16. The set screws 16 are threadably connected to the collar portion 10 and project through such collar portion in the manner shown in Fig. 4 of the drawing. Thus by turning the set screws 16, it is apparent the chasers 4 are firmly wedged between the collar portion 10 and the body of the tap.

It will be understood that such changes and modifications may be made in my invention as fall within the limits of the appended claims.

What I claim is:

1. In a tap, the combination comprising a body member having longitudinal grooves formed therein, a collar portion formed on said body member, chasers fitted to said grooves and extending through said collar portion, a holding ring threaded to the chaser teeth on each side of the collar portion, a holding block positioned in an opening in said collar portion opposite each chaser, and means for wedging said blocks between the collar portion and the chaser.

2. In a tap, the combination comprising a body member having longitudinal grooves formed therein, a collar portion formed on said body member, chasers fitted to said grooves and extending through said collar portion, a holding ring threaded to the chaser teeth on each side of the collar portion, holding blocks positioned in the openings in said collar portion opposite the chasers and engaging the teeth in the chasers, and means secured to the collar portion for forcing said block firmly into engagement with the chaser teeth.

3. In a tap, the combination comprising a body member having longitudinal grooves formed therein, a collar portion formed on said body member, chasers fitted to said grooves and extending through said collar portion, a holding ring threaded to the chaser teeth on each side of the collar portion, holding blocks positioned in the openings in said collar portion opposite the chasers and engaging the teeth in the chasers, and set screws threadably connected to said collar portion for forcing the holding blocks into engagement with the teeth on the chasers.

In testimony whereof, I hereto affix my signature.

CARL SCHRAMM.